(12) United States Patent
Tharp et al.

(10) Patent No.: US 7,745,778 B1
(45) Date of Patent: Jun. 29, 2010

(54) ELLIPTICAL POLARIZERS, TAGS AND IDENTIFICATION SYSTEMS USING FREQUENCY SELECTIVE SURFACES

(75) Inventors: Jeffrey Tharp, Pittsburgh, PA (US); Glenn Boreman, Geneva, FL (US); Daniel E. Mullally, Winter Park, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 12/609,832

(22) Filed: Oct. 30, 2009

Related U.S. Application Data

(62) Division of application No. 12/128,431, filed on May 28, 2008, now Pat. No. 7,629,569.

(51) Int. Cl.
*G02F 1/01* (2006.01)

(52) U.S. Cl. .................. 250/225; 250/227.17; 359/486

(58) Field of Classification Search ................. 250/225, 250/221, 216, 227.11, 227.17; 359/486, 359/494, 495, 566, 569, 571, 572, 573, 574, 359/576
See application file for complete search history.

(56) References Cited

U.S. PATENT DOCUMENTS 6,870,511 B2 * 3/2005 Lynch et al. ................ 343/767

* cited by examiner

*Primary Examiner*—Thanh X Luu
*Assistant Examiner*—Francis M Legasse, Jr.
(74) *Attorney, Agent, or Firm*—Jetter & Associates, P.A.

(57) ABSTRACT

An identification system and associated method for identifying objects includes at least one tag having encoded information attached to the surface of an object to be identified, wherein the tag includes a first FSS-based elliptical polarization filter which provides the encoding. A remotely located receiver including a second FSS-based elliptical polarization filter and a linear polarizer optically coupled to the second filter is operable for differentially attenuating the first and second orthogonal polarization states allowing a determination whether the intensity pattern corresponds to the encoded information.

10 Claims, 11 Drawing Sheets

ELLIPTICAL POLARIZERS, TAGS AND IDENTIFICATION SYSTEMS USING FREQUENCY SELECTIVE SURFACES

CROSS-REFERENCE TO RELATED APPLICATIONS

The present application claims priority to U.S. Provisional Patent Application Ser. No. 60/986,484 filed Nov. 8, 2007, now U.S. Pat. No. 7,629,569 entitled "ELLIPTICAL POLARIZERS, TAGS AND IDENTIFICATION SYSTEMS USING FREQUENCY SELECTIVE SURFACES", which is incorporated by reference herein in its entirety.

FIELD OF THE INVENTION

The invention relates to elliptical polarizers based on frequency selective surfaces (FSS), more specifically to FSS-based elliptical polarizers, and related surface tags and object identification systems.

BACKGROUND

Circular polarizers are a special case of elliptical polarizers. Circular polarizers convert a linearly polarized electromagnetic wave into a circularly polarized wave, or a circularly polarized wave into a linearly polarized wave.

In the case where a circularly polarized wave is to be converted into a linearly polarized wave, it is generally the case that two linearly polarized waves which are orthogonal to each other constitute the circularly polarized wave and the phases of the two linearly polarized waves are displaced by 90 degrees. A circularly polarized wave Ec is converted into a linearly polarized wave Er by retarding the phase of the linearly polarized wave that is advanced 90 degrees to set the phase difference, to 0 degrees.

Conventional circular polarizers are commonly embodied as quarter-wave plates. As such, a common feature of conventional circular polarizers is the need for large, bulky optical components, and/or the requirement for a large resonant cavity for polarization conditioning. Conventional circular polarizers are also generally formed using costly materials.

As known in the art, the modification of the spectral radiation signature of a surface, in absorption, reflection, or transmission, is possible by patterning the surface with a periodic array of electrically conducting elements, or with a periodic array of apertures in an electrically conducting sheet. Spectral modifications have been disclosed using such structures for millimeter-wave and infrared radiation applications and are known as frequency selective surfaces (FSS). As known in the art, in order for its structure to affect electromagnetic waves, the FSS must have structural features at least as small, and generally significantly smaller, as compared to the wavelength of the electromagnetic radiation it interacts with.

Such surfaces have been configured to function as spectral filters, such as low-pass, high-pass, bandpass, or dichroic filters. FSS can even be used as narrowband infrared sources, by virtue of Kirchhoff's Law in which the FSS absorptive properties equal its emissive properties. Other applications include FSS use as a pollutant sensing element, as a reflecting element in an infrared laser cavity and as an infrared source with a unique emission spectrum.

Certain applications could benefit from new FSS-based polarization filters. Moreover, some new applications and related systems could arise from such filters.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

An optical combination includes a substrate, a linear polarizer on the substrate, and a first frequency selective surface (FSS) based elliptical polarization filter on the linear polarizer. The first FSS comprises at least one periodic pattern of spaced apart electrically conductive lines having a sub-wavelength line-to-line spacing. The pattern is operable to impose a phase differential for one orthogonal linear polarization state relative to the other linear polarization state for electromagnetic radiation having a wavelength of 400 nm to 1 mm. In one embodiment, the radiation is infrared (IR) radiation, such as having a wavelength from 1 µm to 12 µm.

An identification system and associated method for identifying objects includes at least one tag having encoded information attached to the surface of an object to be identified, wherein the tag includes a first FSS-based elliptical polarization filter which provides the encoding. A remotely located receiver comprising a second FSS-based elliptical polarization filter and a linear polarizer optically coupled to the second filter is operable for differentially attenuating the first and second orthogonal polarization states allowing a determination whether the intensity pattern corresponds to the encoded information. The system can be an active system which includes an external radiation source, or a passive system that is based on thermal radiation emanating from the tagged object.

DETAILED DESCRIPTION

Figure 1A:
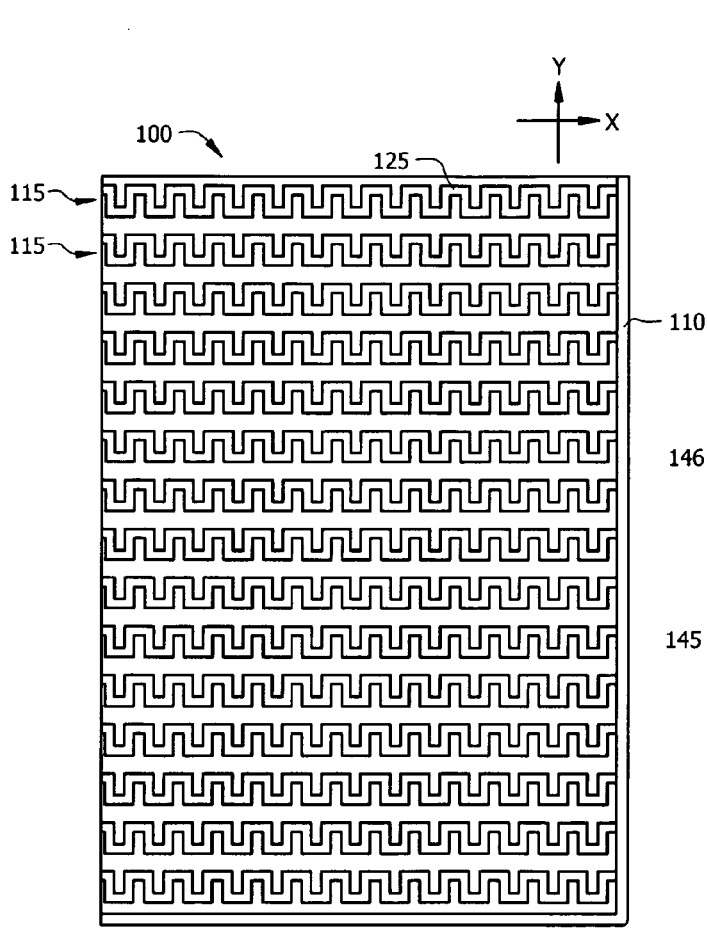
FIG. 1A shows a top view of a frequency selective surface (FSS) based elliptical polarization filter disposed on the surface of a substrate, according to an embodiment of the invention.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

FIG. 1A shows a top view of a frequency selective surface (FSS) based elliptical polarization filter 100 comprising electrically conductive "lines" 115 on substrate 110, according to an embodiment of the invention. The lines 115 are shown orientated along a first axis (shown as the x-axis), and form capacitance in a direction perpendicular to the first axis (shown as the y-axis) with adjacent lines above and below. The lines act primarily as an inductive element along their lengths along the x-axis, leading to a relative phase differential for the respective orthogonal polarizations when processed (re-radiated) by filter 100. The lines 115 which form capacitance along one axis and inductance in the other axis may be referred to as "meanderlines", as they are generally referred to in the Example section below.

Filters and related devices according to the invention are generally integrated structures, formable using conventional integrated circuit fabrication techniques including lithography. This allows filters and related devices according to the invention to be integrated into systems in various places where space may be a limitation.

For transmission mode applications, the substrate 110 is generally optically transparent in the band of interest. In one embodiment the band is within the visible, generally from 0.4 µm to about 0.75 µm. In another embodiment, the band is within the infrared (IR), from 0.75 µm to about 1 mm. The infrared band can be near infrared (NIR), generally 0.75-1.4 µm in wavelength, short-wavelength infrared (SWIR, IR-B DIN), generally 1.4-3 µm in wavelength, mid-wavelength infrared (MWIR, IR-C DIN) also called intermediate infrared (IIR) generally from 3-8 µm in wavelength, or long-wavelength infrared (LWIR, IR-C DIN), generally from 8-15 µm in wavelength. In yet another embodiment, the infrared band can be far infrared (FIR), generally from 15 µm to 1 mm in wavelength.

For example, fused silica, polyimide, barium fluoride, and silicon provide significant transparency for IR <about 10 µm in wavelength. For reflective-mode applications, filter 100 can include a non-optically transparent substrate and can include an reflective surface, such as a metallic or otherwise electrically conductive ground plane beneath the substrate 110 (not shown). In certain embodiments of the application, the substrate 110 is a flexible substrate, such as a thin (<10 µm) polyimide substrate. In the case of semiconductor substrates, such as Si substrates (e.g. wafers), elliptical polarization filters according to the invention can be fabricated on the same chip together with electronic, optical and/or MEMS components generally using conventional integrated circuit processing techniques.

In one embodiment, the elliptical polarization filter is coupled to an optical system, such as integrated on the detection elements of a focal plane array. In yet another embodiment, the elliptical polarization filter is positioned proximate to the aperture of the optical system (e.g. ≦1 cm therefrom, including in contact therewith).

The FSS comprises at least one periodic arrangement of spaced apart electrically conductive "lines" 115 having a sub-wavelength line-to-line spacing, and at least one sub-wavelength geometrical feature 125. The features 125 shown in FIG. 1A are square wave-like and periodic. Although shown as a single feature shape 125, patterns can include more that one feature shape (e.g. triangular and square wave). The lines 115 are generally formed from a metal, although it is also generally possible to form lines 115 from degeneratively doped semiconductors (n+ or p+ doped). The thickness of the lines 115 is generally 40 to 150 nm, such as 60 to 100 nm. Although not shown, the filter 100 can further comprise a dielectric superstrate layer thereon. An antireflective layer (not shown) can also be placed on the superstrate layer.

Figure 1B:
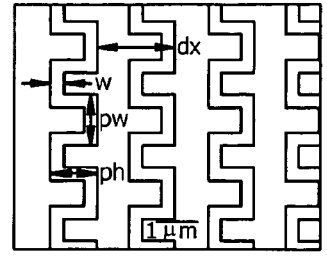
FIG. 1B shows a magnified portion of the FSS shown in FIG. 1A defining various feature design variables.

FIG. 1B shows a top view of a magnified portion of the FSS 100 shown in FIG. 1A. Feature widths are shown submicron, and the other dimensions shown are micron scale. For the features shown, design variables include the width (w), pulse width (pw), pulse height (ph), and periodicity (dx). The parameters shown in FIG. 1B are 0.4 µm, 1 µm, 1 µm, and 2.3 µm, respectively. Based on modeling, the design shown in FIG. 1B is expected to produce radiation with an axial ratio (AR) of 2.0 and a relative phase delay of 64° at 10.6 µm. The AR is defined as the ratio of major to minor axes of the polarization ellipse of the re-radiated electric field (via transmission or reflection mode). For control of the phase differential, w and dx have been found to have the most effect with a minimum disturbance to the AR, while for control of AR without significantly affecting the phase differential, the pulse height (ph) has been found to generally be the most effective. Design aspects are further described in the Example section below.

Figure 1C:
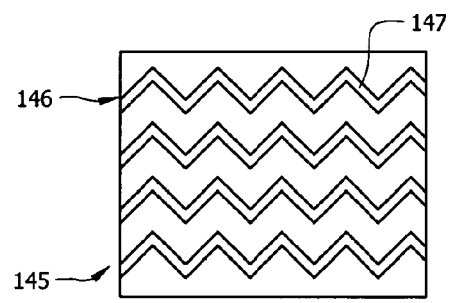
FIG. 1C shows an elliptical polarization filter arrangement according to an embodiment of the invention comprising lines having sawtooth features.
Figure 1D:
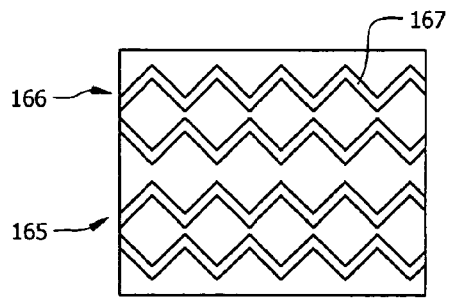
FIG. 1D shows an elliptical polarization filter arrangement according to an embodiment of the invention comprising lines having sawtooth features, wherein the adjacent lines have an exemplary 180 degree out-of-phase relationship.

Although shown as square-waves, the feature shape can be based on other shapes, such as the sawtooth. FIG. 1C shows a filter arrangement 145 according to an embodiment of the invention comprising lines 146 having sawtooth features 147. Although the features shown in FIGS. 1A-C are aligned to be in-phase in a wave sense, the features in the respective lines can be offset and thus out-of-phase in a wave sense relative to one another. FIG. 1D shows an elliptical polarizing filter arrangement 165 according to an embodiment of the invention comprising lines 166 having the sawtooth features 167, wherein the adjacent lines have an exemplary 180 degree out-of-phase relationship. Although the lines shown in FIGS. 1A-D are all continuous lines, at least a portion of the lines can include discontinuities (gaps) up to about 10 µm in length.

The features shown are sized and spaced from one another to be operable for processing a desired band of radiation. As known in the art, smaller dimensions are used for shorter wavelengths. Although generally applicable from 400 nm to 1 mm in wavelength as noted above, in a typical application, filters according to the invention impose a phase differential for one incident orthogonal linear polarization state relative to the other linear orthogonal polarization state for electromagnetic radiation having a free space wavelength of from 1 µm to 12 µm.

Elliptical polarization filters according to the invention can be configured to select certain specific elliptical polarizations. The selectivity depends upon the phase differential imposed by the FSS. Although a phase differential of 90° has generally been demonstrated for elliptical polarization filters according to the invention, any phase differential from 0° to 180° can be selected by an appropriate designed within some tolerance, generally with the aid of user provided models of the behavior of the FSS materials (metals and dielectrics) as a function of frequency and modeling software, such as described below.

Regarding achieving phase differentials >90 degrees, such as up to 180 degrees, a device having multiple stacked FSS layers is generally used. Conceptually, the description used to represent the functionality of the double layer can generally be extended to three or more layers and a higher phase delay. An explanation follows below.

Let a single layer FSS cause a net phase delay of 45° and a transmission of 90% due to metal losses. If an identical layer is placed (stacked) above the initial layer, with the same orientation, and separated by a dielectric thickness of a quarter effective wavelength, an additional phase delay of 45° will occur and the total transmission for the FSS stack will be 0.9*0.9=81%. The new net phase delay is 90°. If another identical layer is added in the stack, the phase delay will increase by another 45° for a total phase delay of 135° and the transmission will be 0.9*0.9*0.9=73%. Additional layers can be added to add additional phase delay. The delay per FSS need not be the same. Accordingly, if a single FSS according to the invention operates as a 90° retarder, if another FSS is stacked that is identical and oriented the same as the first FSS, the phase delay will increase to 180° with no other changes to the basic design. The only penalty is additional loss due to the metal or other electrical conductor which will increase with the number of layers used. In this example, the transmission is about 81% for a quarter wave retarder to about 66% for a half wave retarder.

As described above, the performance of polarization filters according embodiments of the invention, such as filter 100, can be defined in terms of the AR of the re-radiated electric field (via transmission or reflection mode), and also the relative phase delay (phase differential) between the re-radiated orthogonal field components. As known in the art, circular polarization, which is a special case of elliptical polarization, has an AR of 1 and a relative phase difference of ±90°.

For example, designs according to the invention can be performed using the Periodic Method of Moments (PMM) code or other modeling techniques to model the FSS. However, such models generally consider the properties of materials to be constant over frequency, and thus do not provide models for the behavior of materials such as metals and dielectrics as a function of frequency. Particularly for wavelengths $\leq 12$ µm, the present inventors have found that materials can change their characteristics significantly, such as metals that begin to show dielectric behavior.

For example, the Periodic Method of Moments (PMM) method (L. W. Henderson, "Introduction to PMM, Version 4.0," The Ohio State University, Electroscience Lab., Columbus, Ohio, Tech. rep. 725 347-1, Contract SC-SP18-91-0001, July 1993) can be used together with user input material parameters for the materials comprising the FSS. This code has been used for millimeter wave FSS designs, and is capable of designing FSS-based filters to operate at the higher frequency end of the infrared as well as the visible. The PMM output plots the reflection and transmission spectra for the electric field and the power spectra of radiation reflected and transmitted by a FSS. The element dimension, distribution, and electrical properties of all media comprising the elliptical polarizer are inputs to the PMM modeling code. Broadband optical properties of the component materials can be integrated into PMM-based design software. The PMM code design process is generally iterative in nature. HFSS™ from Ansoft Corporation (Pittsburgh, Pa.) may also be used.

To achieve the PMM modeling correlations to measured results, it was found to be generally helpful to incorporate the spectral permittivity values into the program externally. To do this, PMM was called upon from MATLAB™ and run at a single frequency with the permittivity values as measured for that frequency input into the program. This was iterated for each frequency in the band of interest in preset increments.

The desired frequency of operation generally determines the dimensions, spacing and thickness of the FSS features, as well as the materials for the features and substrate (and dielectric layer if present). The properties of the materials in the band of interest (e.g. infrared) are important to device operation in that the substrate should be highly transparent and non-lossy across the band of operation, and the FSS features should be optically absorbent at the desired frequency of operation. Thicker FSS features provide improved attenuation (and thus a higher extinction coefficient), and are thus generally helpful, but are generally limited by properties of available lithographic fabrication processes. As described below, given a desired frequency of operation and polarization response, modeling code can generally be used to determine suitable feature dimensions and materials.

The minimum area of FSS-based elliptical filters according to the invention generally depends on the intended application. The area for the structure to induce a desired 90° phase delay for 3 to 5 µm radiation has generally been found to be approximately 100-225 µm² corresponding to 10×10 µm to 15×15 µm in the case of square regions. This area is based on the necessary coupling between the features to induce the desired impedance, and upon the interaction of features over an area that equates to the substantially the same response as an infinite array.

As described below, filters according to the invention can be coupled to a variety of photodetectors, including photodiodes, bolometers and CCDs, such as to provide camera-based systems. Applied to cameras, for example, filters according to the invention can be relatively small if applied on the image plane (pixels), or be relatively large if incorporated in the front of the optical lens system of the camera. The in front filter position provides a simple procedure to change the filter. Cameras according to embodiments of the invention are further described below relative to FIGS. 5A and B.

Filters according to the invention have been generally found to provide a broadband response. In practice, filters according to the invention are designed to function within a given tolerance over a desired band of interest. There will generally be some spectral variation in the AR and phase differential in this band, however the performance is defined in terms of a tolerance. An example is that ideal circular polarization has an axial ratio of 1. However if light has an axial ratio of $\leq 1.5$ it can be considered close enough if that is the tolerance required in a given application. Accordingly, for example, circularly polarized radiation can be defined as radiation having an AR below 1.5 over the whole band of interest (e.g. 3 to 5 µm).

The induced phase differential has been found to be essentially independent of the angle of the incident polarization. For example, a broad angular response of up to $\pm 40°$ has been measured for prototype filters according to the invention. However, since the transmission or reflection magnitudes will generally vary, the minimum of the AR of the transmitted or reflected radiation will shift to longer or shorter wavelengths depending on whether the linear polarization is rotating clockwise or counter clockwise.

In operation, if an elliptical polarization filter according to the invention receives equal mix of orthogonal plane polarized polarization states having no relative phase shift, upon re-radiation, the two states will have a phase differential relative to one another of a fixed amount, such as 90° in the circular polarizer embodiment. In general, the component of the polarization along the feature axis (x-axis in FIG. 1A) will be advanced in phase while the component perpendicular to this axis will be retarded in phase. Also the transmission amplitudes have been found to have similar amplitudes (thus an AR of almost 1), which when combined with the phase differential in the case of 90° phase differential will constitute emitted light that is circularly polarized.

In another example, again embodied as an exemplary circularly polarizing filter, if a polarization filter according to the invention receives circular polarized light, by definition an equal mix of orthogonal polarization states, with one polarization shifted 90 degrees relative to the other, the result will depend upon the handedness of the circularly polarized light (whether the phase delay in the incident circularly polarized light is +90° or 90°). If the circular polarizer is aligned in such a fashion that the phase differential between the linear components is increased by another 90° then the effect is the same as a half wave retarder with a fixed linear polarizer behind it. The total phase delay will now be 180°. The output of the circular polarizer will be complete attenuation since linear polarization of the light will be oriented perpendicular to the transmission axis of the linear polarizer component in the circular polarizer. If the circular polarizer reverses the phase differential of the circularly polarized light, the total phase delay will be 0°. The output will be essentially the complete passage of the incident power since the output linear polarization will be aligned with the transmission axis of the linear polarizer in the circular polarizer.

The selectivity for specific polarizations provided by the elliptical polarization filter is generally based on the orientation of the feature geometry. In the case of a circularly polarizing filter, the orientation of the axis the features are aligned along (e.g. the x-axis in FIG. 1) determines whether the applied phase delay is either +90° or −90°. This is due to the anisotropic impedance on the features, the phase delay depending upon orientation of the incident linear polarization to the feature axis. Their relative positions to one another determine whether left or right circularly polarized radiation is radiated. By rotating the FSS structure from 0° to 90°, the handedness of the transmitted radiation will be different.

Figure 2:
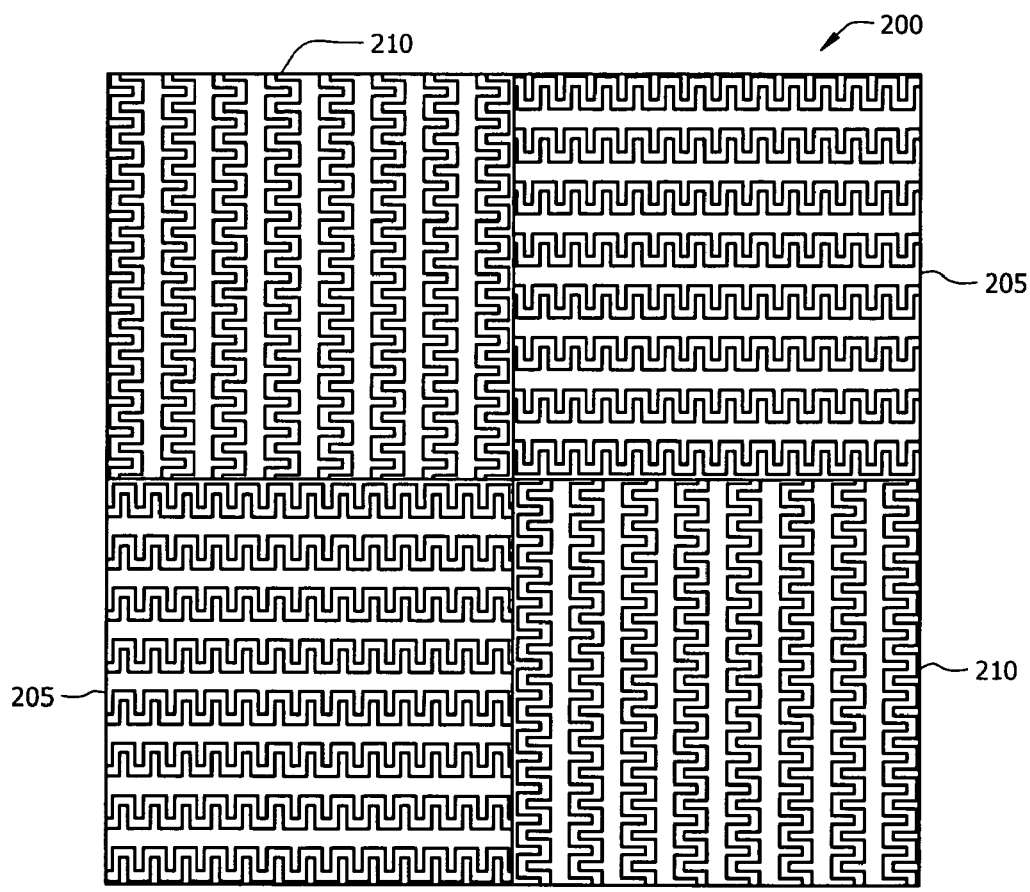
FIG. 2 shows a top view of an FSS according to an embodiment of the invention comprising a plurality of repeating sub-patterns including an alternating first and a second sub-pattern.

FIG. 2 shows a representation of an FSS-based encoding elliptical polarization filter 200 according to an embodiment of the invention comprising a plurality of repeating sub-pattern portions 205 and 210 including providing a first and a second sub-pattern, respectively (substrate not shown). For maximum contrast upon receipt of the re-radiated signal, as shown in FIG. 2, the respective sub-patterns have their feature-comprising axis rotated 90 degrees relative to one another. However, when maximum contrast is not required, the relative axis can be rotated less than 90 degrees, such as 65, 70, 75, 80 or 85 degrees.

Although not shown, the pattern can provide any symbol. For example, the pattern can comprise a plurality of alphanumeric characters defined by one polarization response portion of the filter area (vertically oriented; appearing bright in the re-radiated image) to define the alphanumerics as compared to a second polarization response portion of the filter area (substantially horizontally oriented; appearing dark in the re-radiated image).

Although only two different sub-patterns are shown in FIG. 2, elliptical polarization filters according to the invention can utilize more that two different sub-patterns. In a larger scale, the overall pattern would be seen as an alternating pattern. The sub-patterns can also be different, irrespective of their relative orientation. In embodiments of the invention described below, transmitted radiation through the encoding FSS-based filter 200 can be decoded by a remotely located imaging receiver including a polarizing filter according to the invention which provides the decoding function by outputting a differential intensity pattern to provide visibility for the encoded pattern in response to reradiated radiation from encoding FSS-based filter 200. The decoding device is referred to herein as an "optical combination" which generally comprises a linear polarizer optically coupled to a polarization filter which provides the differential attenuating function.

As used herein, differential attenuating refers to attenuating one polarization state by at least a factor of 5 in measured intensity after polarization filtering as compared to the measured intensity after polarization filtering of one or more other polarization states. In this embodiment the optical combination can essentially completely attenuate one polarization state while essentially completely passing the other polarization state for a very high difference in intensity ratio. The intensity ratio is generally limited by the extinction performance of the linear polarizer on the filter, usually >100 difference in intensity ratio for commercial linear polarizers.

A single layer elliptical polarization filter embodiment, such as shown in FIGS. 1A and 2, can be useful in situations where the transmitted power level is of little concern. With regarding to polarizing capability, the performance for a one layer filter was found to be similar to multi-layer filters designs according to the invention, such as with regard the circular polarizing capability. An exemplary single layer design according to an embodiment of the invention in transmission mode was found to provide ~15% transmission over the LWIR, while multi-layer inventive designs have been found to generally provide significantly higher transmitted power levels, such as up to 60%, or more. However, although elliptical polarization filters according to the invention can comprise three or more FSS layers, at certain frequencies, resistive losses in the metals can begin to degrade the re-radiated power levels.

Figure 3A:
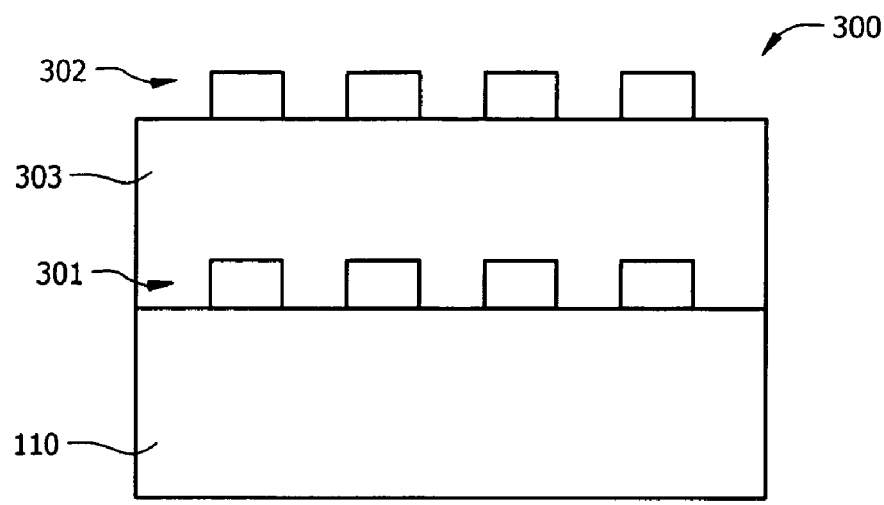
FIG. 3A shows a cross sectional depiction of a multiple-FSS layer elliptical polarization filter according to another embodiment of the invention.

FIG. 3A shows a cross sectional depiction of a multiple-FSS layer elliptical polarization filter 300 according to another embodiment of the invention built on substrate 110. FSS layer 301 is separated from FSS layer 302 by a dielectric layer 303. The dielectric layer in one embodiment comprises a benzocyclobutene (BCB) layer. The thickness of the dielectric layer is shown as b, and is generally selected to be at or near a quarter of the effective mean wavelength of the radiation being processed. This quarter wavelength separation is generally far enough away to prevent inter-layer coupling between adjacent FSS layers while generally being the closest for in phase interaction between the two FSS layers. By in phase interaction, the two layers will have constructive interference that leads to a minimum of reflected power and a maximum in transmission. For processing radiation having a free space wavelength of 3 μm in the case the dielectric is BCB, the dielectric thickness corresponding to a quarter of the effective mean wavelength is about 600 nm, or in a range form 500 to 700 nm (or about ±15% of the nominal ¼ of the effective mean wavelength).

The feature axes of respective FSS layers 301 and 302 are rotationally aligned relative to one another, defined herein as being within 10 degrees of rotation, such as less than 2 degrees. The respective FSS layers 301 and 302 may be generally translated in-plane an arbitrary amount relative to one another without limitation. Embodied as a filter, the FSS layers will generally provide a single orientation.

Figure 3B:
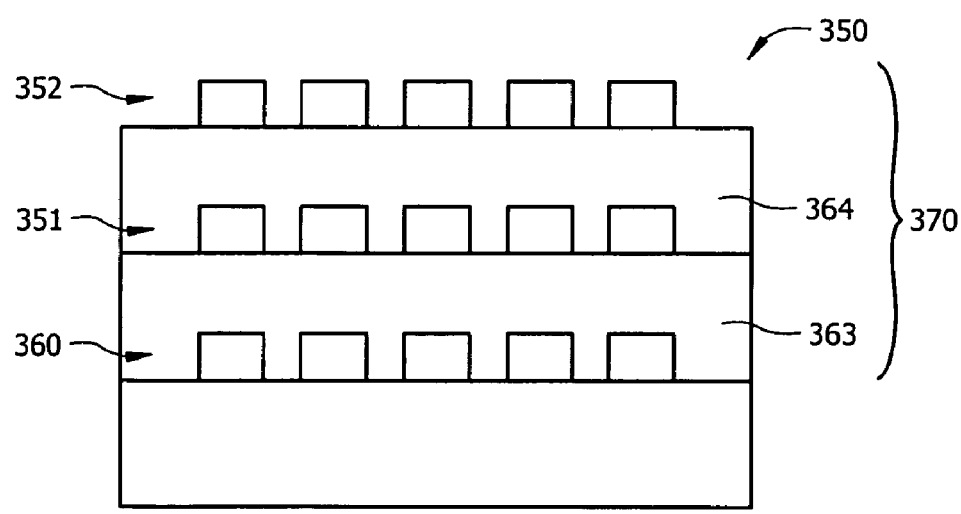
FIG. 3B shows a cross sectional depiction of an optical combination comprising an elliptical polarization filter comprising multiple-FSS layers together with a linear polarizer optically and integrally coupled to the elliptical polarization filter, according to another embodiment of the invention.

FIG. 3B depicts a cross sectional depiction of an optical combination 350 comprising an elliptical polarization filter 370 comprising spaced apart multiple-FSS layers 351 and 352 together, and a linear polarizer 360 on substrate 110 optically coupled to the filter 370, according to another embodiment of the invention. Linear polarizer 360 can be embodied as a wire grid array. As known in the art, a wire grid polarizer comprises a regular array of parallel metallic wires, placed in a plane perpendicular to the incident beam, wherein the separation distance between the wires is less than the wavelength of the radiation, and the wire width is a small fraction of this distance. A first dielectric layer 363 is between the linear polarizer 360 and FSS layer 351, and a second dielectric layer 364 is between FSS layer 351 and FSS layer 352.

Used as a surface tag, the FSS layer 351 and 352 will each have different orientations to encode the desired information. In this embodiment, optical combination 350 can impose a particular elliptical polarization (including the special case of circular polarization) in an encoded pattern (e.g. alternating left hand and right hand circular polarization) from unpolarized radiation (e.g. thermal IR) emitted from the surface that the tag is attached to. In one embodiment, the output of the linear polarizer 360 is at an angle of 44 to 46 degrees (nominally 45 degrees) with respect to the feature axis of both FSS 351 and 352 to provide an equal mix of orthogonal linear polarization states from incident unpolarized radiation, such as from thermal radiation from substrate 110. Embodied as a tag, FSS 351 and 352 can both comprise a plurality of repeating sub-patterns, such as the sub-patterns 205 and 210 shown in FIG. 2. As noted above, the pattern shown in FIG. 2 comprises a first and a second sub-pattern, wherein the first sub-pattern is rotated 90 degrees relative to the second sub-pattern. In one embodiment the absolute value of the phase differential imposed by optical combination 350 is from 86 to 94 degrees and the AR is from 1.0 to 1.5.

In certain applications, tags according to embodiments of the invention can be based on polarization filter 300 shown in FIG. 3A (with no linear polarizer) modified for the FSS to include a plurality of repeating sub-patterns, such as the sub-patterns 205 and 210 shown in FIG. 2. In this embodiment, a reflective structure, such as a ground plane, is located beneath the tag. For example, polarization filter 300 shown in FIG. 3A can be modified for the FSS to include a plurality of repeating sub-patterns and an underlying reflective structure can be used for reflection-mode based identification systems when an external source of linearly polarized light is provided.

Figure 4A:
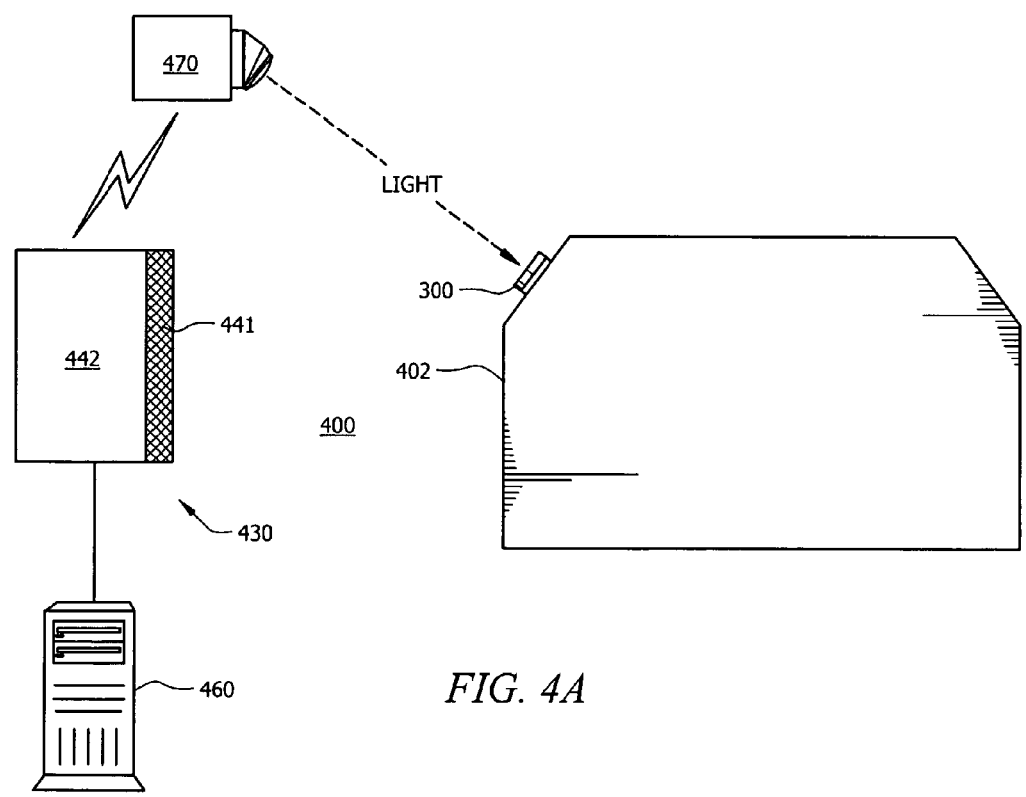
FIGS. 4A and B each show depictions of exemplary target identification systems, according to embodiments of the invention.

FIG. 4A shows a depiction of an exemplary reflection-based identification system 400 according to an embodiment of the invention. In this embodiment, at least one elliptical polarization filter, such as filter 300 having the exemplary pattern shown in FIG. 2 for both respective FSS, is attached as a tag to the surface of an object to be identified, shown as the object 402 shown. The filter 300 now includes an underlying reflective structure 417, such as a ground plane. Although only one filter/tag 300 is shown, in most practical applications a plurality of filter/tags are generally attached to the object to be identified. The filter/tag pattern encodes information through its emission pattern. A receiver 430 including a filter 441 according to the invention, such as optical combination 350, and some imaging means 442, for example a CCD camera or infrared focal plane array (IRFPA) is also provided. As described above, although filter 441 is shown on the lens of imaging means 442, filter 441 can be integrated with the detector, such as positioned on top of detectors of a focal plane array.

Filter 441 comprises one or more FSS according to the invention operable for differentially attenuating one elliptically polarized emission (e.g. from subregion 205) relative to the other elliptically polarized emission (from subregion 210), along with a linear polarizer whose transmission axis is fixed to about 45° to the feature axis. Filter 441 creates an intensity pattern evidencing a differential between the first and second polarization emitting portion when viewing radiation from the surface of object 402. The filter 441 will generally include only one feature orientation. For example, the filter 441 can preferentially (e.g. at least a factor of 5 in intensity) select one elliptical polarization (circular left) relative to another polarization (circular right).

The system includes a processor or computer 460 coupled to the imaging means 442 for determining whether the intensity pattern corresponds to the information encoded by the tag (e.g. specific checkerboard pattern or series of alphanumeric characters). Processor or computer 460 can include a microprocessor.

A light source 470, such as a laser, is also provided for reflection mode operation. The light source can provide unpolarized light, or provide linearly polarized light, such as by using an external linear polarizer. The filter/tag 300 in reflection mode could serve a purpose in an active system that emits a laser beam and searches for a reflector with the desired polarization properties.

In one reflection-mode embodiment, the incident polarization can be linearly polarized from an external source. If the incident linear polarization is 45 degrees with respect to axes of the FSS lines, the reflected radiation will be left circularly polarized in one subregion (e.g. subregion 205) and right circularly polarized (e.g., subregion 210) by a polarization filter such as filter 300 having the pattern shown in FIG. 2. As noted above, the re-radiated radiation can also be in different elliptical polarization patterns using different patterns (e.g., AR=2 phase differential of ±60 degrees).

Using a tag/filter 300 on an object such as object 402 in an arrangement to impress circular polarization may be particularly useful in certain applications since there is no known naturally occurring circular polarized IR radiation. One such application is for identification from a plurality of similar objects or articles. Other applications include night vision, industrial, R & D, maintenance, condition monitoring, medical, security, law enforcement. In applications were conformal coverage is required, tags can be fabricated on certain plastic substrates.

Figure 4B:
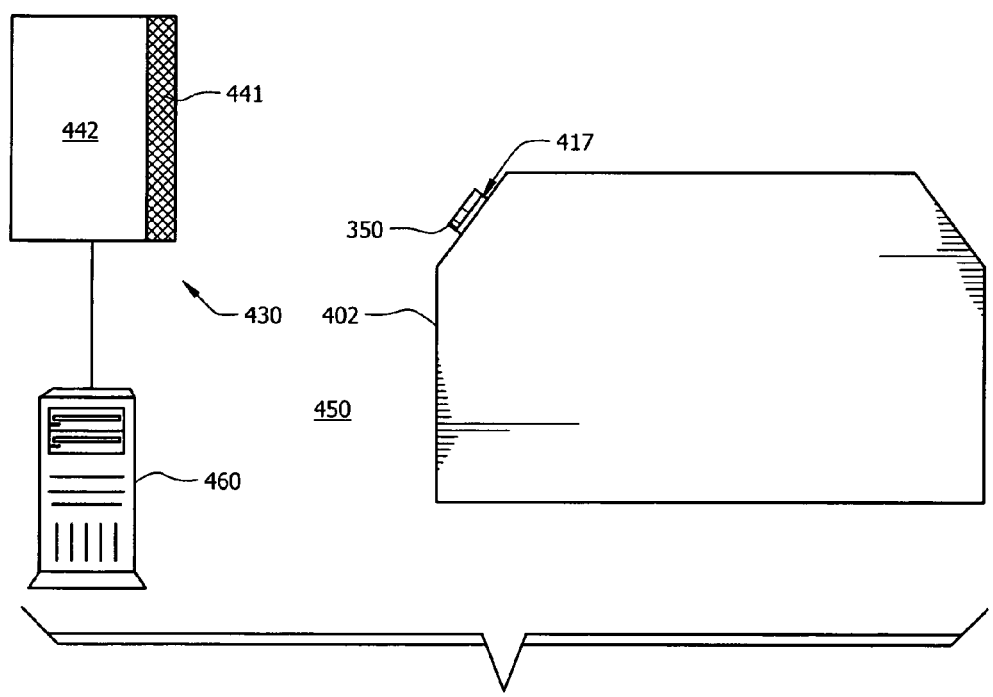

As shown in FIG. 4B, the system can comprise a passive emission mode system 450, whereby unpolarized radiation (e.g., IR) is provided by the object itself 402 (e.g., thermal radiation) which after emission is converted to polarized light by a filter according to an embodiment of the invention. The conversion is shown provided by optical combination 350 according to the invention shown in FIG. 3B, comprising a linear polarizer coupled to an encoding polarization filter according to the invention. As with system 400, in this embodiment, the elliptical polarization filter component of filter 441 will only generally include only one orientation.

A related method for identifying objects comprises the steps of providing at least one polarizing tag comprising a frequency selective surface (FSS) comprising a first and at least a second different polarization emitting portion onto a surface of an object to be identified. Responsive to radiation received at or emitted from the surface, which can be from an external source or from the object itself (e.g., thermal radiation), the tag emits encoded information comprising a first elliptically polarized emission from the first portion and a second different elliptically polarized emission from the second portion. The first and the second elliptically polarized emission are differentially attenuated relative to the other and processed to create intensity differential pattern when remotely viewing radiation emanating from the surface. It is then determined if the intensity pattern corresponds to the encoded information. In one embodiment, the tag emits left and right hand circular polarization from first and second portion, respectively.

The method can also include the step of adhering the tag using delivery of a plurality of tags dispersed in a binder material, wherein the binder material is an IR transparent material. For example, a thin layer of oil can be used. In IR applications, the tags can be 10 μm×10 μm flakes.

The invention is expected to have a wide range of applications. For example, the invention can be used to provide improved infrared cameras are based on solely on thermal imaging. A conventional FLIR camera is configured similar to a standard digital camera. A standard digital camera includes in serial combination optics (including a lens), a CCD array, where the lens focuses the image on the CCD array, and A/D converter and memory. The cells in the CCD array each produce a voltage based on the light intensity hitting the cell. The A/D converter converts each voltage to a scaled value, such as 0 to 255. The scaled integer values are then passed to the memory, where each sensor in the CCD has a specific location that is duplicated in the memory.

Figure 5A:
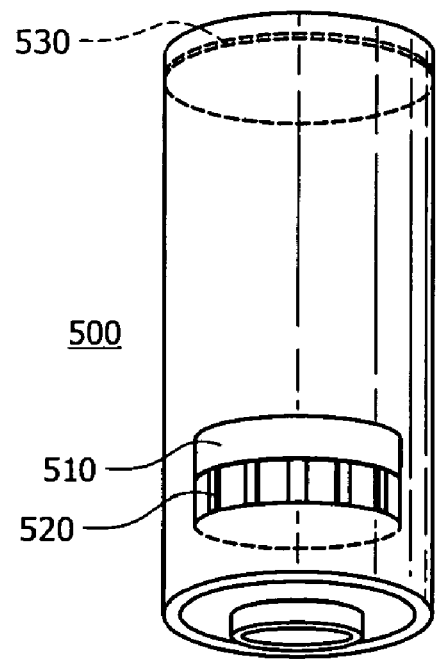
FIG. 5A shows a FLIR camera including an elliptical filter disposed on detector array, according to an embodiment of the invention.
Figure 5B:
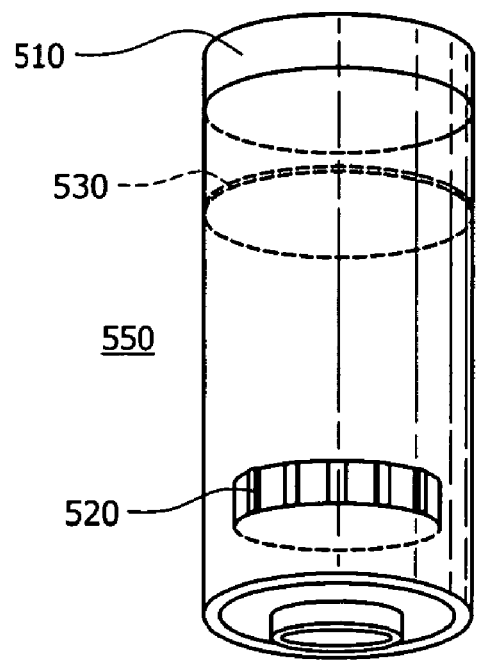
FIG. 5B shows another camera arrangement, wherein the elliptical filter is disposed on or just in front of the camera optics, according to another embodiment of the invention.

Unlike the digital camera, the optics of a FLIR camera are transmissive to IR radiation and its sensors are sensitive to IR radiation, rather than to visible radiation. Transmission-based IR FSS-based elliptical filters according to the invention can be integrated over a portion of or the entire detector array (focal plane array) of the camera. For example, FIG. 5A shows a FLIR camera 500 including an elliptical filter 510 disposed on detector array 520. Camera 500 also includes camera optics 530. FIG. 5B shows another camera arrangement 550, wherein the elliptical filter according to the invention 510 is disposed on or just in front of the camera optics 530. Either arrangement provides a conventional IR imager with polarization-sensitive imaging capability. Thus, unlike conventional FLIR cameras which can only detect spectral changes, FLIR cameras according to the invention can detect both spectral and polarization changes.

Through the ability to detect polarization changes allows for polarimetric imaging, which is the ability to distinguish different polarization in a scene. The ability to detect both spectral and polarization information using FLIR cameras according to the invention is expected to provide enhanced detection sensitivity. Enhanced detection sensitivity can improve combat readiness and other military related applications, including night vision and surveillance.

Polarization filters according to embodiments of the invention may also be used for optical isolators. For example, an elliptical polarization filter according to an embodiment of the invention can be placed in the path of light emitted from a laser that would otherwise reflect back into the laser cavity, such as due to reflection off a specular reflecting (e.g., flat) surface. Linearly polarized light from the laser can be converted to elliptically polarized light, say having right handedness by an elliptical filter according to an embodiment of the invention before reaching the specular reflector. The specular reflector will generally shift the handedness, such as from right handedness to left handedness, which will not be transmitted by the elliptical filter, thus providing the desired optical isolation.

EXAMPLES

The present invention is further illustrated by the following specific Examples, which should not be construed as limiting the scope or content of the invention in any way.

FSS Fabrication:

An FSS according to an embodiment of the invention was written on a silicon substrate with a Leica EBPG 5000+ electron-beam lithography (EBL) system. The substrate was a silicon wafer of 375 μm thickness for mechanical stability during fabrication and testing.

Submicron feature size is well within the resolution of the EBL system, producing a uniform pattern across the field. To fill the minimum sample field requirement of the optical characterization systems, the FSS-based surface must generally extend over a three millimeter square. This was accomplished by stitching write fields using the Leica pattern generation and stage control software.

After exposure in the EBL system, the FSS was developed in a 25% solution of methyl isobutyl ketone in isopropanol (3:1::IPA:MIBK). The device was then taken through a descum process in oxygen plasma to ensure clarity of the written features. Manganese to form the FSS elements was deposited via thermal evaporation. Features were lifted off in a methylene chloride bath with ultrasonic agitation. The FSS was cleaned with solvents and dried with dry nitrogen before spectral characterization.

Device Design

The program used for the design described herein was the Ohio States Periodic Method of Moments (PMM) code with an in-house add on that accounted for frequency dependent material properties. The add-on used MATLAB™ to control and manage PMM data while bringing the measured frequency dependent permittivities into the simulation.

Regarding determination of the frequency dependent permittivities, the frequency dependent material properties were used to represent the traveling wave "speed" and attenuation as the wave propagates in the medium as a function of frequency. The parameter of interest was the complex electrical permittivity. The real part of the permittivity represents the phase velocity of a traveling wave in the dielectric, which is generally important to determine the "effective wavelength." This effective wavelength represents the wavelength of the traveling wave in the medium which was generally found to be important for devices according to embodiments of the invention since the separation layers were constructed using dielectrics (BCB, Si, etc.) The performance of the multiple layer meanderlines structures were found to be very dependent upon knowing the correct value for the real part of the permittivity as a function of frequency as this determined the thickness of the dielectric used to separate the meanderlines. The real part of the permittivity was also found to be important in determining the correct geometric dimensions of the meanderline since the structure was fabricated at the boundary of two media (air and the substrate). This complex interaction could only be accounted for using the frequency dependent permittivity values. The imaginary part of the permittivity represents the attenuation characteristics of the dielectric. This value was very important to include to ensure that the highest transmission could be achieved using a particular dielectric.

The relative permitivities were measured using ellipsometry. The basic description of ellispometry is that it characteristics of light changes as it reflects from different materials. An ellipsometer measures the differences in the light (amplitude and relative phase) as it reflects. Using numerical relations and known fitting models, the amplitude and relative phase of the reflected light can be converted to the electrical properties of the media of interest. The frequency dependent values come from the fact that the ellipsometer measures the reflection characteristics at many frequencies simultaneously using Fourier Transform Infrared Spectroscopy.

The FSS design generally comprises design of the meanderlines which comprise the FSS, such as meanderlines 115 shown in FIG. 1A, there is generally no purely analytical method currently available by which a meanderline retarder can be designed for implementing a desired function. However, the present inventors have found that there are generally trends that occur in the performance of the meanderline retarder as the various geometric parameters are varied. These trends can be utilized to generally rapidly determine an appropriate meanderline retarder for the desired function. The method generally comprises adjusting a plurality of the geometric parameters of the meanderline retarder to provide the highest overall transmission, the flattest spectral axial ratio, and a flat spectral phase delay that is at a desired value.

After the initial scaling down of a corresponding RF design by the ratio of the RF wavelength to the effective IR or other wavelength (e.g. visible), the different design variables that can be left to the meanderline designer to achieve the performance to meet a particular specification to implement a desired function. The geometric parameters that have generally been found to be most useful for varying the phase delay are w and d, which are described above relative to FIG. 1B. As described in more detail below, as either w or dx is decreased, the phase delay is generally increased while having minimal effect on the location of the spectral minimum of the AR. Moreover, to vary the spectral minimum of the AR, the ph parameter has been found to show the best effect. Finally, as the ph is increased the spectral minimum of the AR has been found to be generally shifted to shorter wavelengths while not significantly altering the phase delay.

The pw and ph are both referenced from the center of the strip and dx is the distance from a given point on the meanderline to the same point on the neighboring meanderline. An advantage of using these variables is that they are all independent of the width of the strip, w.

The model investigated for the tolerance study was the single layer meanderline quarter-wave retarder on a Si substrate. Using the single layer design a single parameter can be changed and the results quickly determined. The dimensions for the single layer meanderline for operation between 8 μm and 12 μm were: pw=0.9 μm, ph=0.8 μm, dx=1.45 μm, and w=0.6 μm. The performance is shown in terms of the axial ratio and phase delay. This study was done to identify the general trends in the phase delay and axial ratio (AR) as various geometric parameters were varied. The trends that are found in the tolerance study are generally used in the design process to further improve the polarimetric properties of the design.

The first investigation was to observe the effect of changing the width, w, of a meanderline layer. Conceptually, it was expected that the impedance of the component along the meanderline axis to become larger as w is increased. This would lead to a larger phase delay due to the increased inductive impedance that would be expected as the width increased. However, along with increasing the phase delay, there will be a larger mismatch in impedance leading to more reflected power. This would lead to an expectation that the total transmitted power would also be decreased.

Figure 6A:
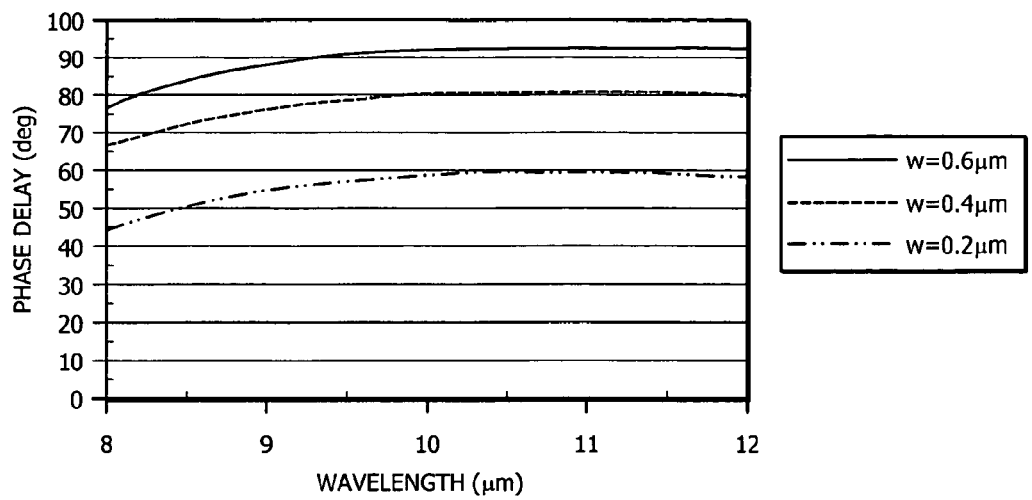
FIGS. 6A and B show data obtained from modeling for the relative phase delay and axial ratio (AR) as a function of meanderline width, according to an embodiment of the invention.
Figure 6B:
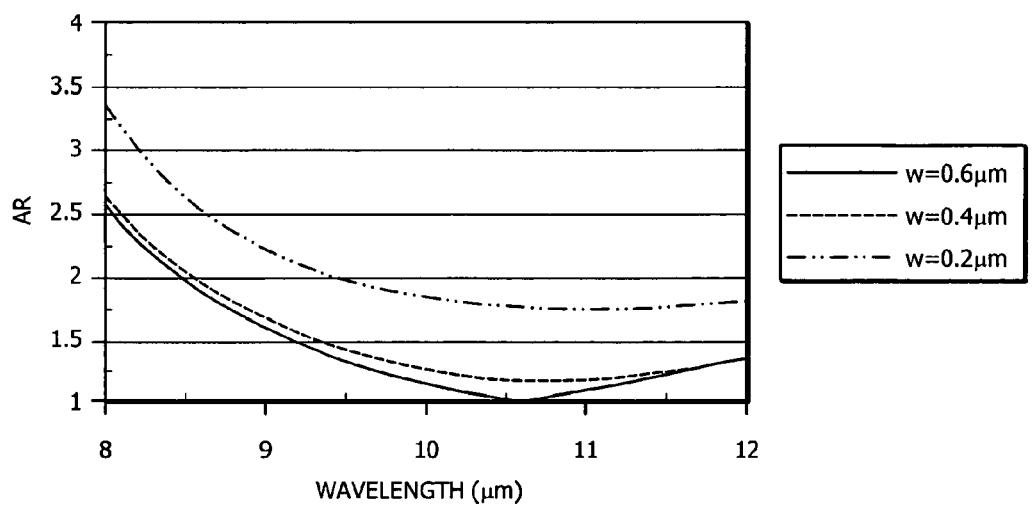

FIGS. 6A and 6B show phase delay and axial ratio (AR) data, respectively, obtained from a modeled analysis performed as the width in the single layer meanderline is varied from 0.2 μm to 0.6 μm, in increments of 0.2 μm. The modeled results shown in FIG. 6A evidence a significant change in the phase delay as the width is increased. Specifically, the phase delay at a wavelength of 10 μm increases from 58° to 94° as the width increased from 0.2 μm to 0.6 μm. As shown in FIG. 6B, the AR shows a minimum at a wavelength of 11 μm with a width of 0.2 μm. This minimum location shifts to 10.5 μm as the width increases to 0.6 μm. This spectral shift in the AR is small and demonstrates that the width of a meanderline structure can be increased as nearly a free variable to increase the phase delay. The increase in phase delay is thus gained without a large shift in the minimum location of the AR as the width is increased with all other parameters held constant.

Figure 7A:
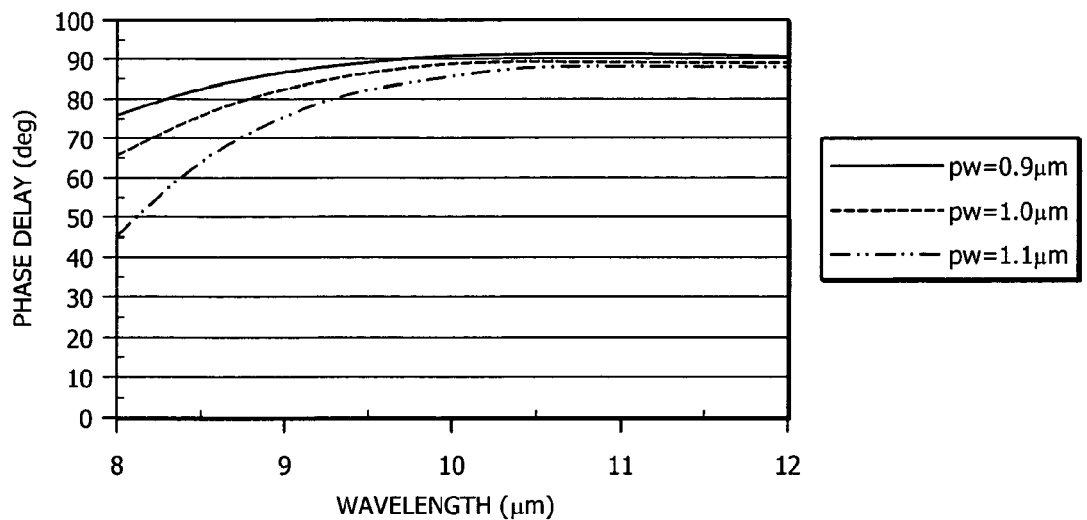
FIGS. 7A and B show data obtained from modeling for the relative phase delay and axial ratio (AR) as a function of meanderline pulse width (pw), according to an embodiment of the invention.
Figure 7B:
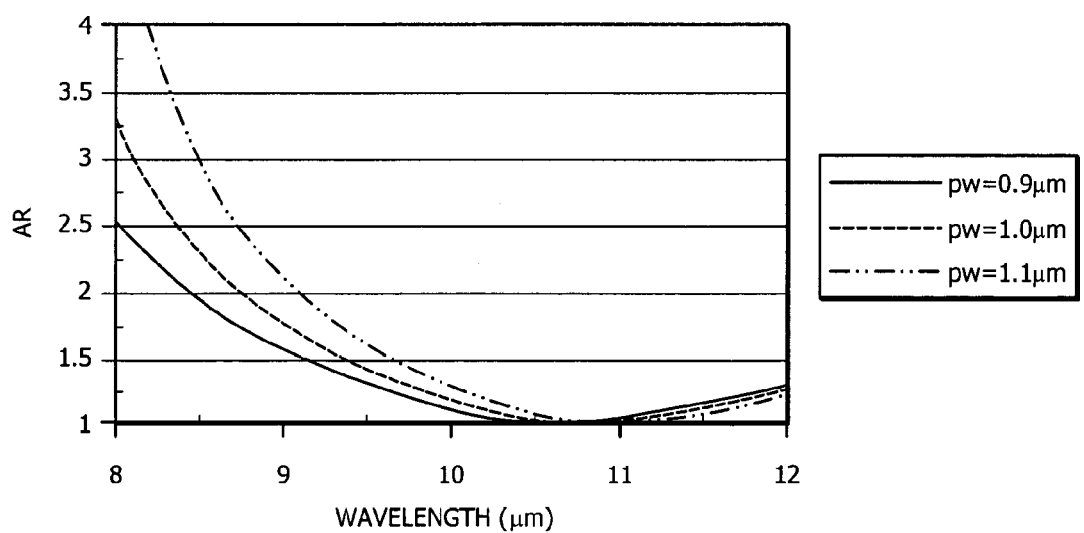

The next parameter that was varied was the meanderline pulse width, pw, while all the other parameters were held constant. The conceptual perception for the impact of pw on the meanderline performance was primarily dependent on the relative size of pw to ph. If the pw became much larger that the ph, it was expected that the structure would act more like a linear polarizer. However, such sizes were not investigated since the desire of the example was to induce and control the phase delay. The pw was varied from 0.9 μm to 1.1 μm in steps of 0.1 μm to determine the trend of increasing the pw. The results of the modeling for phase delay and AR are shown in FIGS. 7A and 7B, respectively. From FIGS. 7A and 7B, the variation of pw is seen to have a minor impact on the phase delay and the AR of the meanderline.

Figure 8A:
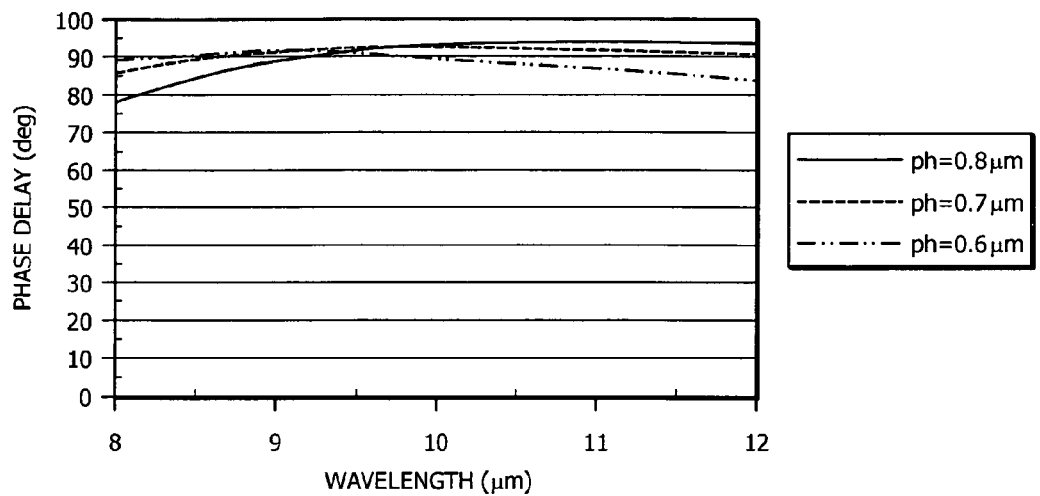
FIGS. 8A and B show data obtained from modeling for the relative phase delay and axial ratio (AR) as a function of meanderline pulse height (ph), according to an embodiment of the invention.
Figure 8B:
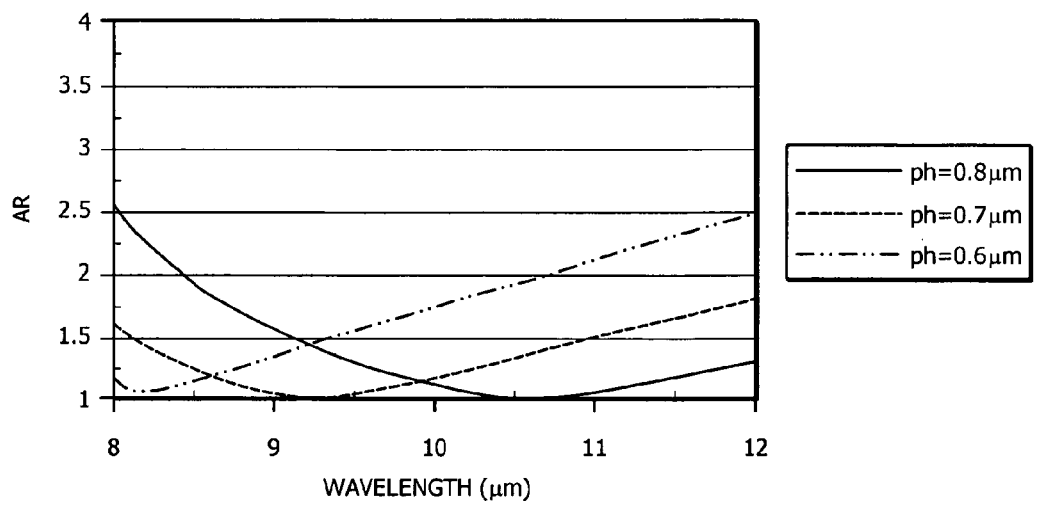

The next parameter that was varied was the pulse height, ph. The ph is a constrained value since it can be no larger that the difference between the period and the width, dx−w, to prevent overlap between the adjacent meanderlines. The modeled result for this investigation is shown in FIGS. 8A and 8B where the ph was varied from 0.6 μm to 0.8 μm in steps of 0.1 μm.

A conceptual prediction of the effect of varying the ph prior to the numerical modeling was limited to an expectation that the resonance location where AR is equal to 1 would shift. The numerical results for the effect of varying the ph shows that the variation in the ph significantly shifts the minimum AR spectral location, while only mildly affecting the phase delay.

Figure 9A:
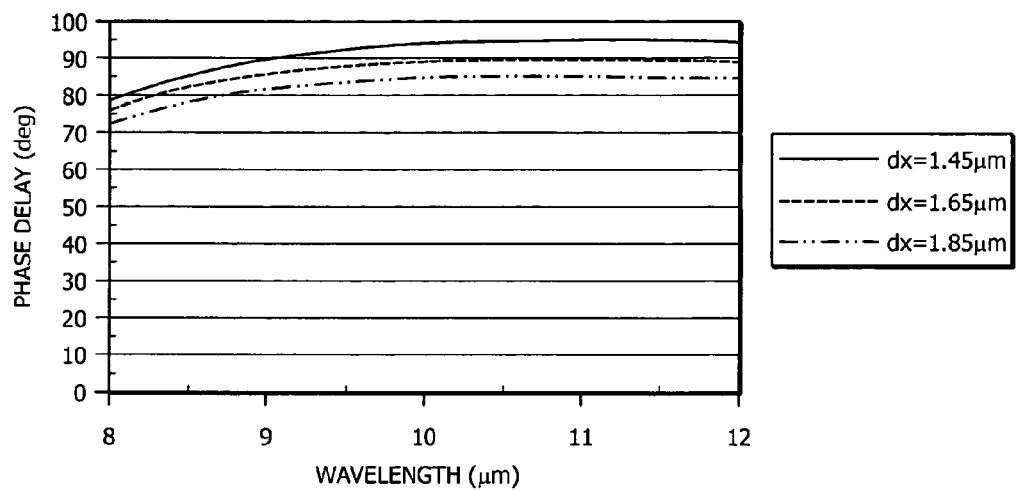
FIGS. 9A and B show data obtained from modeling for the relative phase delay and axial ratio (AR) as a function of meanderline periodicity (dx), according to an embodiment of the invention.
Figure 9B:
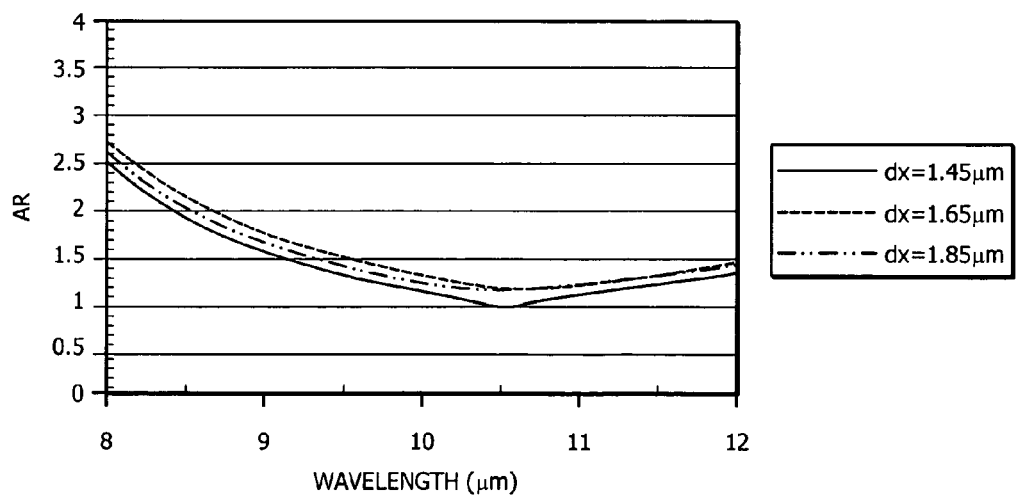

The final geometric meanderline parameter varied was the spatial period, dx. The dx variable was expected to have a strong impact by increasing the impedance as it decreases. This is caused by the expected increase in the electromagnetic coupling between the meanderlines as dx decreases. This coupling should increase both the inductive and capacitive impedance components as dx decreases. Therefore a net increase in the relative phase delay was expected for a decrease in the period. There should also be a higher transmission as the period increases since the impedance mismatch would be lower, leading to lower reflections. The modeled results for the variation of the period is shown in FIGS. 9A and B for the phase delay and AR, respectively, for dx ranging from 1.5 µm to 1.9 µm in increments of 0.2 µm. FIG. 9A shows that a decrease in dx increases the phase delay. It is also seen from FIG. 9B that the minimum spectral location of AR does not significantly shift as dx changes.

Test and Exemplary Performance:

A reflection-based system similar to system 450 shown in FIG. 4B described above was tested. The system tested included a heater strip coupled to the object to be identified to increase the intensity of the thermal radiation emitted from the object. A circular polarizing tag having different feature orientations according to the invention was brought proximate to the object to be imaged and was imaged using a MWIR FLIR having a circular polarizing filter then a linear polarizer in the front of the MWIR FLIR. Although the filter and linear polarizer was spaced apart from the MWIR FLIR, an integral (contact) arrangement could have been used.

The tag used comprised a linear polarizer having a dual layer polarization filter thereon having a plurality of repeating sub-patterns including a first and a second sub-pattern which were rotated 90 degrees relative to one another as shown (analogous to filter 350 using FSS-based filter 200. The different orientations provided by the tag was used to encode the desired information. In contrast to the tag, the polarization filter used in the receiver 430 was a single orientation (an orientation and features matching one of the two sub-patterns). The filter in one orientation combined with a linear polarizer was found to clearly distinguish between the two states of circular polarization (left and right) emitted from the tag to read the encoded message.

Figure 10B:
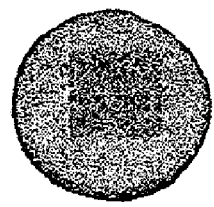
FIGS. 10A-C shows scanned images taken using a MWIR FLIR-based system with no polarization filter in front, a conventional linear polarizer in front, and a FSS-based circular polarizing filter including a linear polarizer in front of an MWIR FLIR according to an embodiment of the invention, respectively.
Figure 10C:
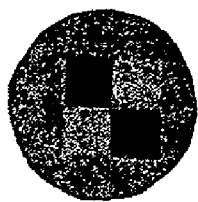
Figure 10A:
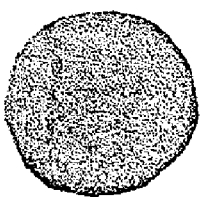

FIGS. 10A-C shows scanned images taken using a MWIR FLIR-based system with no polarization filter in front, a conventional linear polarizer in front, and a FSS-based circular polarizing filter including a linear polarizer in front of an MWIR FLIR according to an embodiment of the invention, respectively. The images were integrated over a wavelength range from 3-5 µm. The checkered feature structure of the tag on the object revealed no checker pattern without a polarization filter according to the invention in front of the MWIR FLIR because circularly polarized light independent of its polarization state (e.g., left- or right-handed) is indistinguishable from unpolarized light in such an arrangement. Both left and right handed circular polarization thus appear identical to an unfiltered camera. This is also true for the placement of a linear polarizer in front of the MWIR FLIR as shown in FIG. 10B. Since circular polarization has an equal electric field amplitude in all polar angles, both left and right hand circularly polarized light again appear indistinguishable from one another. The high visibility of the MWIR FLIR with a FSS-based circular polarizer according to the invention shown in FIG. 10C is due the inclusion of the polarization filter according to the invention that acts as a retarder for only one of the two polarization states received.

In operation, the polarization filter component associated with MWIR FLIR converted the two handed (left and right) circular polarizations into two linear polarization states. One circular state, say right handed, was converted to a linear polarized state with an orientation at +45° to the feature axis. The other circularly polarized state, say left handed, was converted to linear polarization with an orientation at −45°. As described above, the final layer of filter 441 is a linear polarizer whose transmission axis is fixed to about 45° to the feature axis. This polarizer will pass essentially all radiation that is aligned to 45°, with the light that is aligned to −45° is oriented orthogonal to the transmission axis of the linear polarizer being therefore completely attenuated. This leads to the very high visibility between the left and right circularly polarized states shown in FIG. 10C.

This invention can be embodied in other forms without departing from the spirit or essential attributes thereof and, accordingly, reference should be had to the following claims rather than the foregoing specification as indicating the scope of the invention.

In the preceding description, certain details are set forth in conjunction with the described embodiment of the present invention to provide a sufficient understanding of the invention. One skilled in the art will appreciate, however, that the invention may be practiced without these particular details. Furthermore, one skilled in the art will appreciate that the example embodiments described above do not limit the scope of the present invention and will also understand that various modifications, equivalents, and combinations of the disclosed embodiments and components of such embodiments are within the scope of the present invention.

Moreover, embodiments including fewer than all the components of any of the respective described embodiments may also within the scope of the present invention although not expressly described in detail. Finally, the operation of well known components and/or processes has not been shown or described in detail below to avoid unnecessarily obscuring the present invention.

One skilled in the art will understood that even though various embodiments and advantages of the present Invention have been set forth in the foregoing description, the above disclosure is illustrative only, and changes may be made in detail, and yet remain within the broad principles of the invention. For example, some of the components described above may be implemented using either digital or analog circuitry, or a combination of both, and also, where appropriate may be realized through software executing on suitable processing circuitry. The present invention is to be limited only by the appended claims.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

We claim:

1. An identification system, comprising:
   at least one tag having encoded information attached to a surface of an object to be identified, said tag comprising a first elliptical polarization filter, said first elliptical polarization filter comprising a first frequency selective surface (FSS) disposed on said surface, said first FSS comprising least a first periodic pattern of spaced apart electrically conductive lines having a sub-wavelength line-to-line spacing, said lines including at least one subwavelength geometrical feature, said pattern being operable to receive incident radiation having a wavelength between 400 nm and 1 mm and output radiation having a phase differential for a first orthogonal linear polarization state relative to the other linear polarization state;

a receiver remotely located from said tag operable for differentially attenuating said first and said other orthogonal polarization states comprising a second elliptical polarizing filter coupled to receive said output radiation, said second elliptical filter comprising a second FSS comprising least one periodic second pattern of spaced apart electrically conductive lines having a sub-wavelength line-to-line spacing, said lines including at least one subwavelength geometrical feature, and a first linear polarizer optically coupled to said second elliptical polarizing filter;

a photodetector optically coupled to said linear polarizer for generating an intensity pattern, and a processor operable for determining whether said intensity pattern corresponds to said encoded information.

2. The system of claim 1, wherein said wavelength is from 1 μm to 12 μm.

3. The system of claim 1, wherein said first pattern comprises a plurality of first and a plurality of second sub-patterns, said lines associated with said first sub-pattern aligned along a first axis and said lines associated with said second sub-pattern being along a second axis that is rotated 70 to 90 degrees relative to said first axis.

4. The system of claim 3, wherein at least a portion of said second sub-pattern is substantially aligned and has at least a pattern portion substantially matching said first sub-pattern or said second sub-pattern is operable for passing said output radiation from said first or said second sub-pattern, wherein after processing by said linear polarizer and detection by said photodetector radiation transmitted by said pattern portion forms bright regions in said intensity pattern.

5. The system of claim 1, wherein substrate comprises a flexible substrate.

6. The system of claim 1, wherein an absolute value of said phase differential imposed by said first elliptical polarization filter is from 86 to 94 degrees or 175 to 185 degrees.

7. The system of claim 1, wherein said tag further comprises a second linear polarizer sandwiched between said surface of said object and said first FSS, wherein said system is an entirely passive system.

8. The system of claim 1, further comprising a light source for providing said incident radiation, wherein said incident radiation is linearly polarized.

9. The system of claim 8, wherein said tag further comprises a reflective layer interposed between said first FSS and said surface of said object.

10. An identification system, comprising:

at least one tag having encoded information attached to a surface of an object to be identified, said tag comprising a first elliptical polarization filter, said first elliptical polarization filter comprising a first frequency selective surface (FSS) disposed on said surface, said first FSS comprising least a first periodic pattern of spaced apart electrically conductive lines having a sub-wavelength line-to-line spacing, said lines including at least one subwavelength geometrical feature, said pattern being operable to receive incident radiation having a wavelength between 400 nm and 1 mm and output radiation having a phase differential for a first orthogonal linear polarization state relative to the other linear polarization state;

a receiver remotely located from said tag operable for differentially attenuating said first and said other orthogonal polarization states comprising a second elliptical polarizing filter coupled to receive said output radiation, said second elliptical filter comprising a second FSS comprising least one periodic second pattern of spaced apart electrically conductive lines having a sub-wavelength line-to-line spacing, said lines including at least one subwavelength geometrical feature, and a first linear polarizer optically coupled to said second elliptical polarizing filter;

a photodetector optically coupled to said linear polarizer for generating an intensity pattern, and a processor operable for determining whether said intensity pattern corresponds to said encoded information, wherein said first pattern comprises a plurality of first and a plurality of second sub-patterns, said lines associated with said first sub-pattern aligned along a first axis and said lines associated with said second sub-pattern being along a second axis that is rotated 70 to 90 degrees relative to said first axis, and wherein at least a portion of said second sub-pattern is substantially aligned and has at least a pattern portion substantially matching said first sub-pattern or said second sub-pattern is operable for passing said output radiation from said first or said second sub-pattern, wherein after processing by said linear polarizer and detection by said photodetector radiation transmitted by said pattern portion forms bright regions in said intensity pattern.

* * * * *